May 4, 1954   P. J. CAMPBELL   2,677,311
MACHINE TOOL

Filed Nov. 2, 1950   9 Sheets-Sheet 3

Inventor
Paul J. Campbell

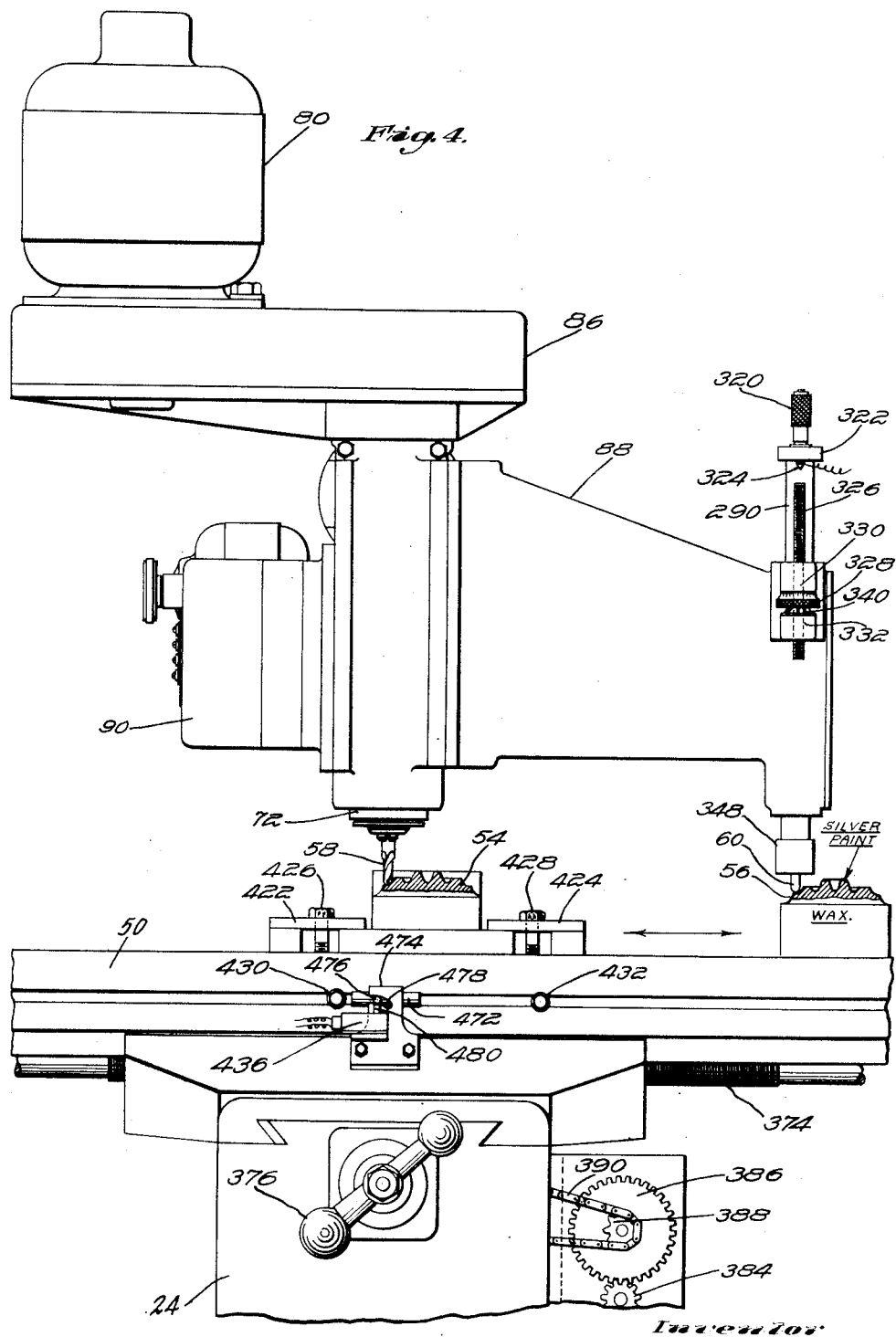

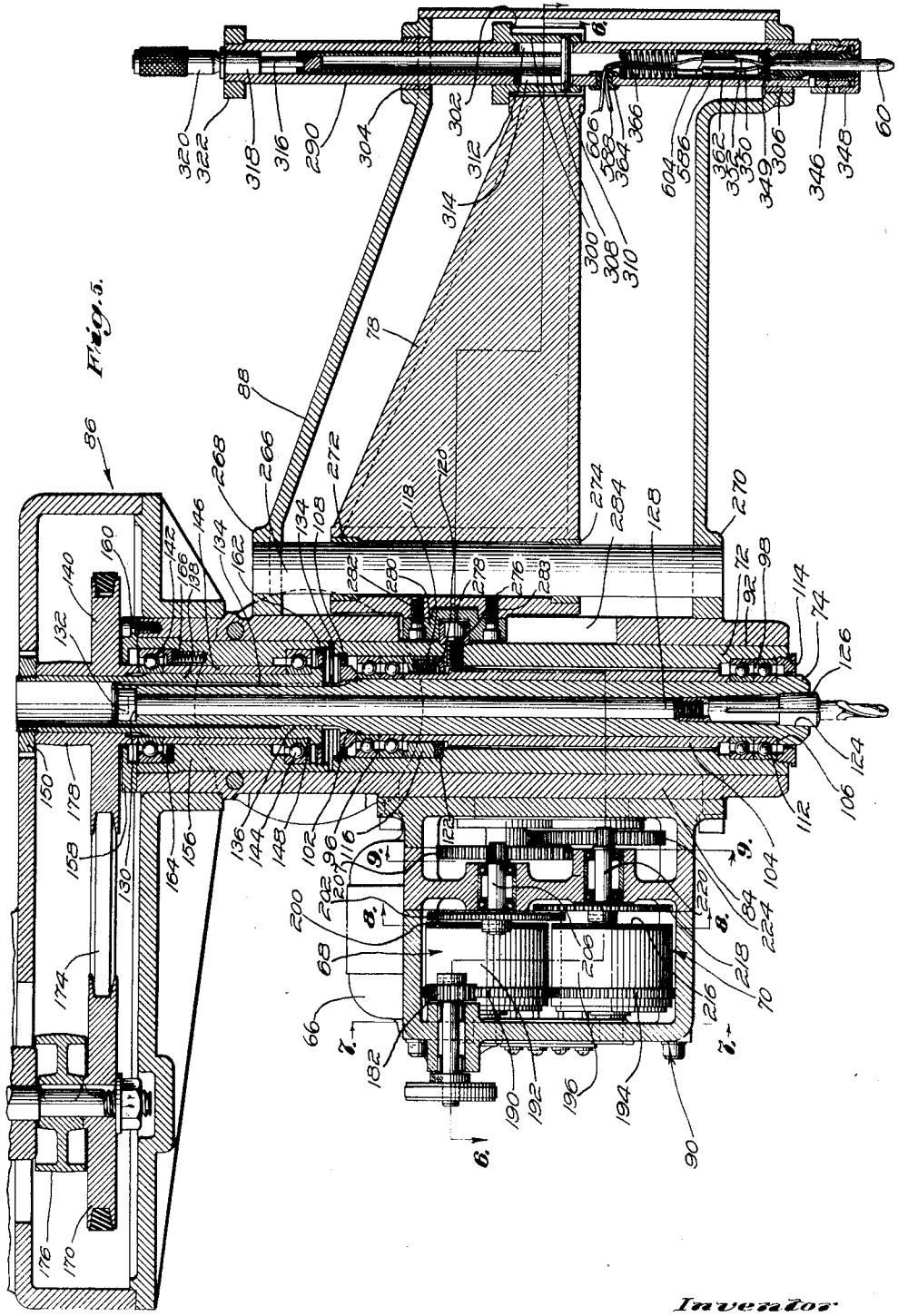

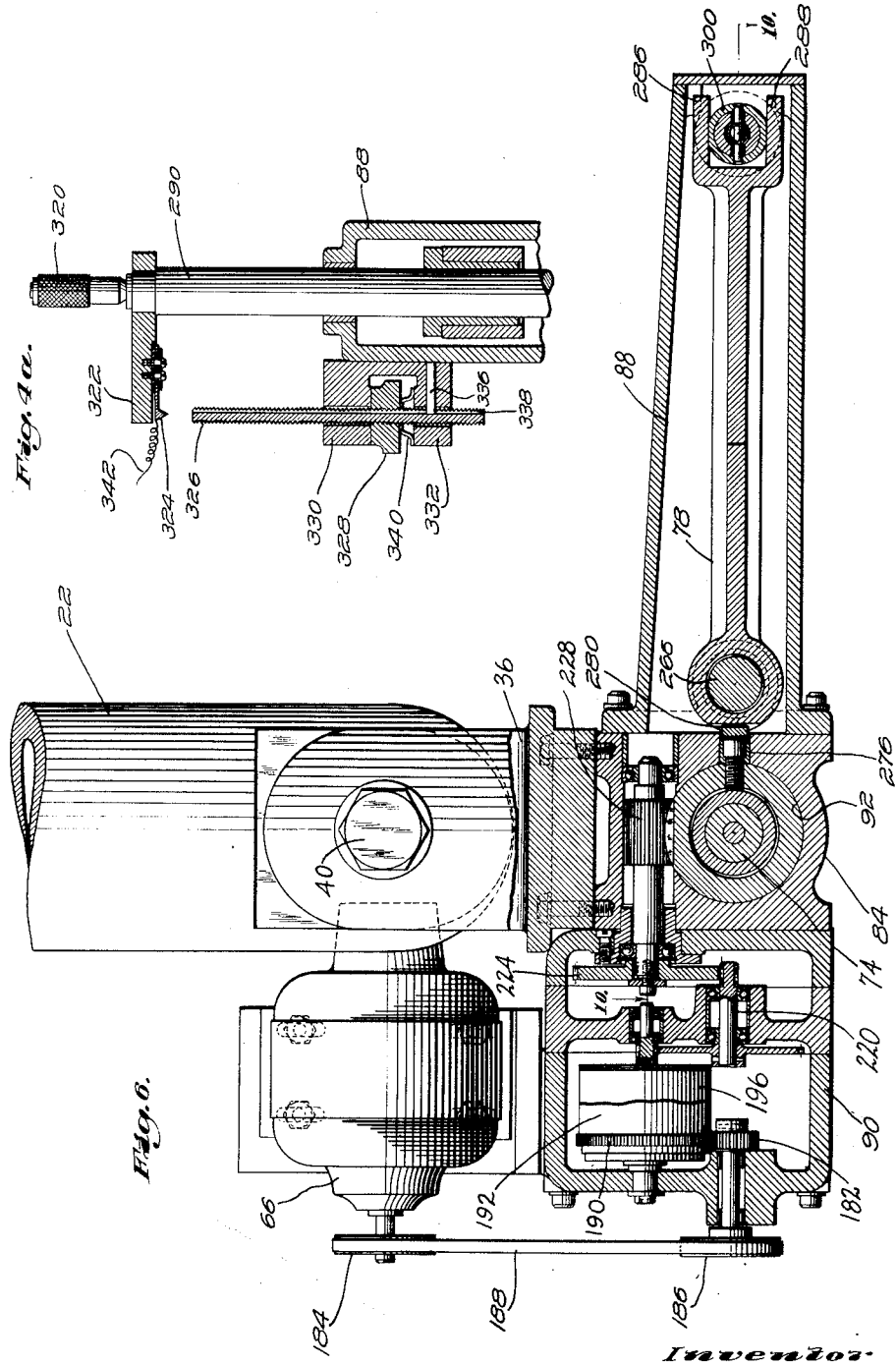

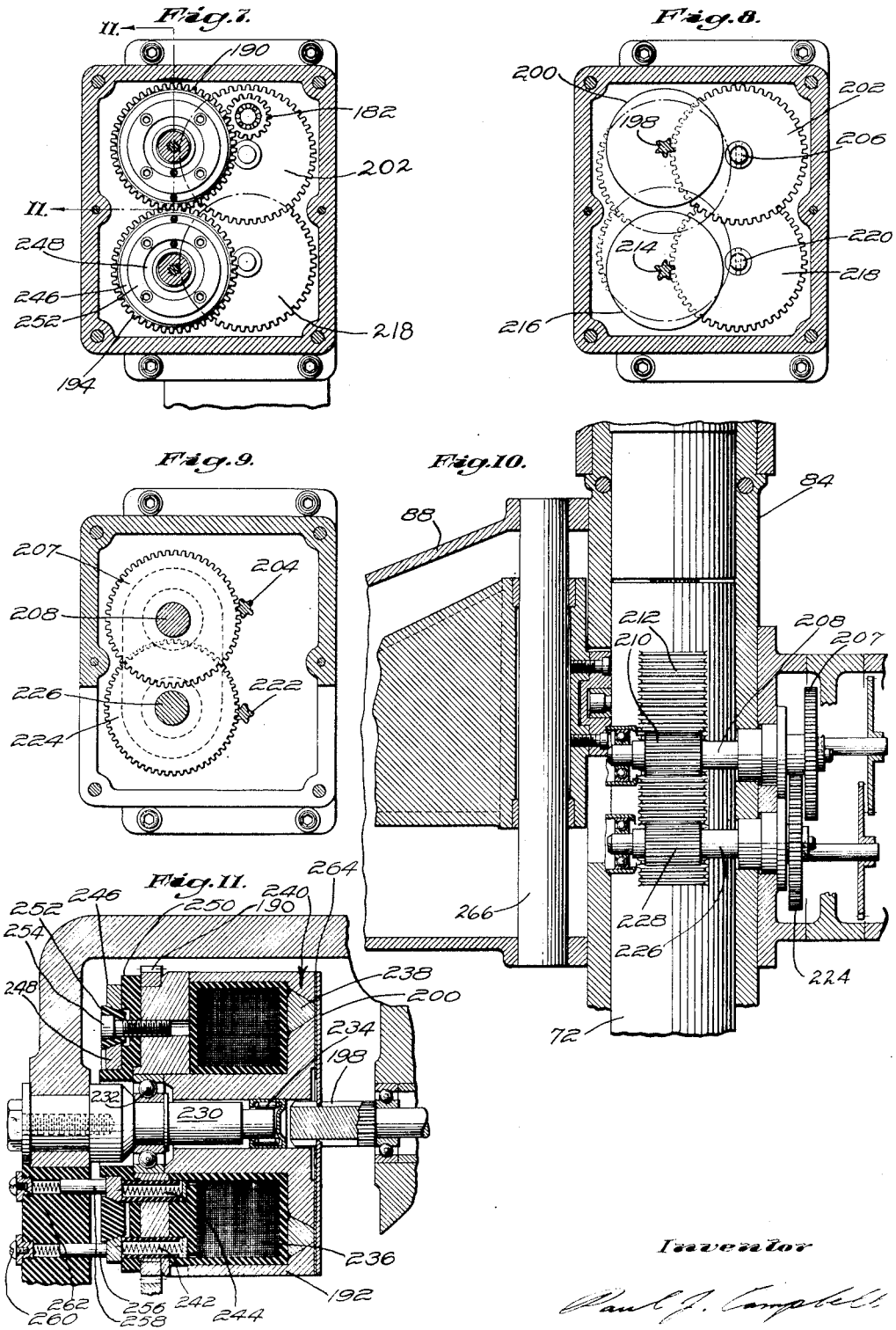

Inventor
Paul J. Campbell

May 4, 1954     P. J. CAMPBELL     2,677,311
MACHINE TOOL
Filed Nov. 2, 1950     9 Sheets-Sheet 9
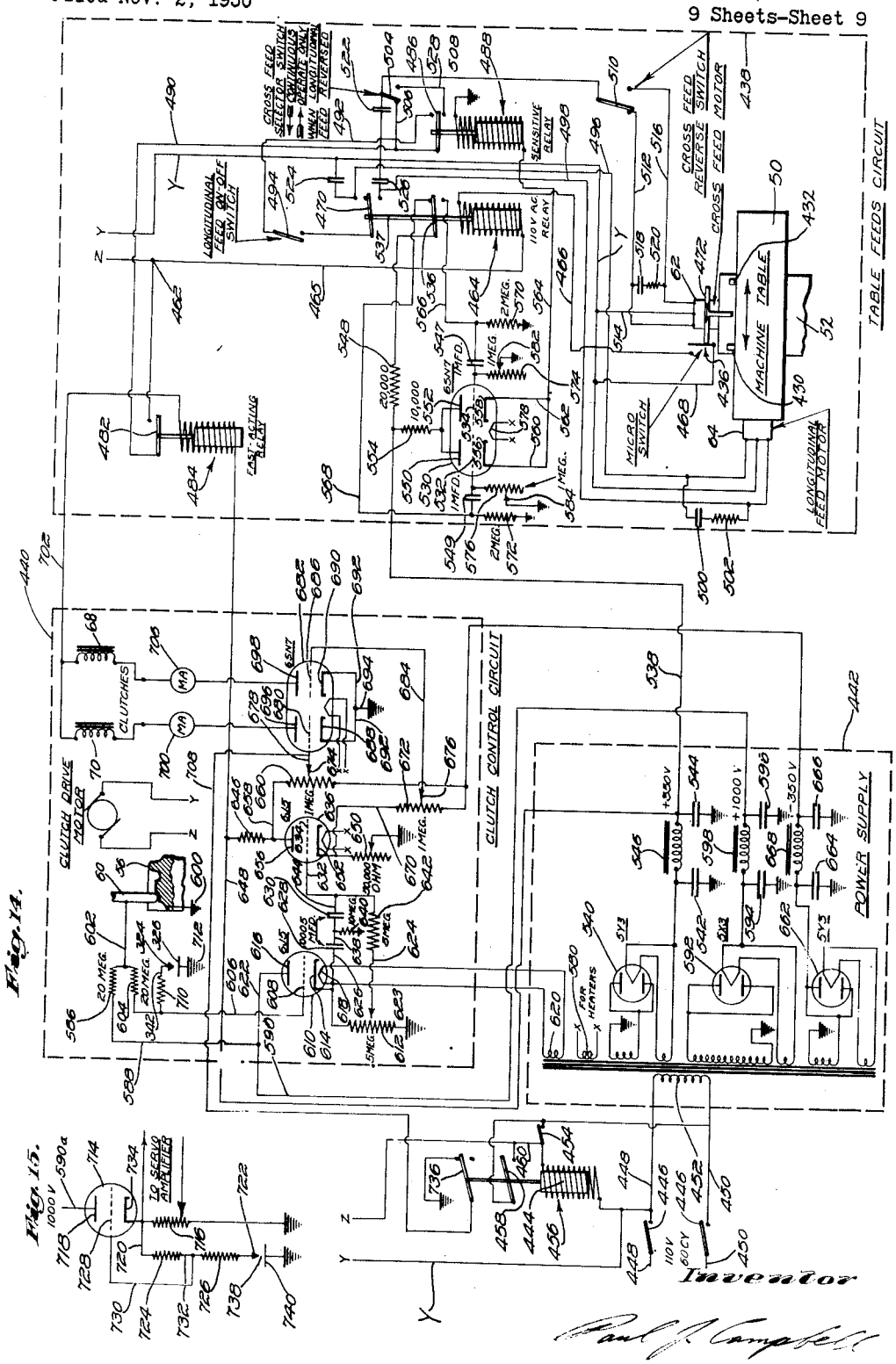

Patented May 4, 1954

2,677,311

UNITED STATES PATENT OFFICE 2,677,311

MACHINE TOOL

Paul J. Campbell, Middletown, Conn.

Application November 2, 1950, Serial No. 193,685

14 Claims. (Cl. 90—13.5)

This invention relates primarily to machine tools, and particularly to a duplicating or copying machine for reproducing in a workpiece the form of a model, template or pattern. The present application is a continuation-in-part of my prior copending application, Serial Number 65,052, filed December 13, 1948.

An object of the present invention is to provide improvements in apparatus and methods for causing a sensing element such as a follower or tracer to follow the contour of a pattern moved relative thereto, and for causing a tool associated with said follower to move relative to a workpiece in a path determined by the path of movement of the sensing element relative to the pattern.

Another object is to provide improvements in methods and apparatus for relatively moving a pattern and follower and a workpiece and tool automatically with an electrically controlled scanning motion.

Another object is to regulate electrically the traversing motion of a pattern following element in accordance with changes in feed requirements of a tool controlled by said follower element.

A further object is to provide certain new and improved elements, and sub-combinations of elements, which though capable of use in other systems and in other machines, are particularly useful in connection with the tracer-pattern scanning and following system and the tool-workpiece scanning and feeding system of a duplicating machine tool.

Other objects and advantages of the invention will be apparent from the detailed description below of a presently preferred embodiment of the invention and from the attached drawings which disclose the specific construction of said preferred embodiment, as follows:

Figure 4 is a front view of the tool and follower head, together with the upper portion of the vertically adjustable knee, the transversely movable slide, and the longitudinally movable table shown in Figures 1 and 2.

Figure 4a is a transverse sectional view of the micrometer depth stop.

Figure 5 is a longtiudinal sectional view through the tool and follower head.

Figure 6 is a top view, partly in section, of the tool and follower head, taken along the line 6—6 in Figure 5.

Figure 7 is a sectional view along the line 7—7 in Figure 5.

Figure 8 is a sectional view along the line 8—8 in Figure 5.

Figure 9 is a view along the line 9—9 in Figure 5.

Figure 10 is a rear view of a part of the vertical drive for the quill and a section of the follower arm, with some sections of the housings broken away to reveal the gearing.

Figure 11 is a partial sectional view along the line 11—11 in Figure 7.

Figure 14 is a wiring diagram showing schematically the control circuits for the follower and tool feed mechanism, the cross slide and table feed mechanisms, and the interconnections therebetween.

Figure 15 is a partial wiring diagram showing schematically a modification of the control circuit for the tool and follower feed mechanism.

Figure 1:
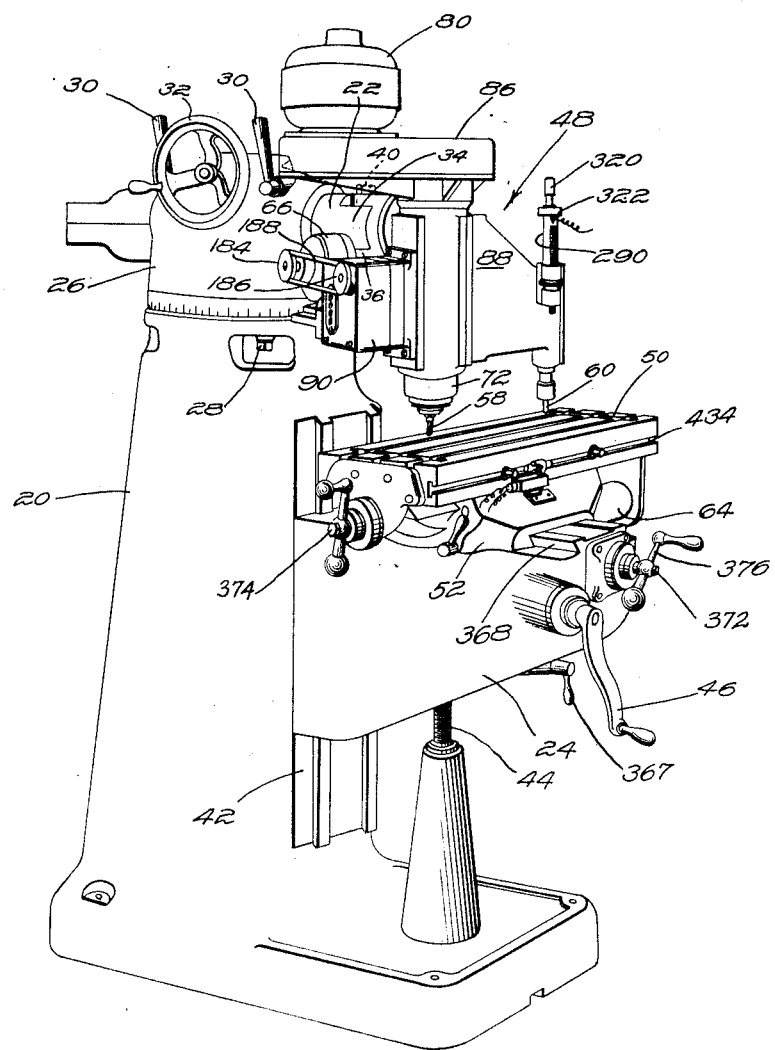
Figure 1 is a perspective view of a milling machine of standard commercial manufacture, but modified for use as a duplicating machine by attachments incorporating tracer-pattern following mechanism, tool-workpiece feeding mechanism, and pattern-tracer, workpiece-tool scanning mechanism constructed in accordance with the invention.

Apparatus embodying the invention can be constructed alternatively as a special purpose machine or as an attachment designed for use with a conventional machine tool of standard manufacture. In the embodiment illustrated in the drawing the invention comprises a specially constructed tool and follower head adapted to be used in conjunction with specially constructed cross slide and table feeding mechanism as attachments on a standard milling machine of conventional design.

The conventional milling machine parts consists of a base or frame 20 for supporting a biaxially adjustable mounting arm 22 over a vertically adjustable knee 24. The arm is mounted for rotation about a horizontal axis in a turret 26 which in turn is mounted for rotation about a vertical axis on the top of the base 20. Bolts 28 serve to lock the turret in adjusted angular position with respect to the vertical axis while clamps 30 serve to lock the arm in any selected angular position with respect to the horizontal axis. A worm mechanism operated by a hand wheel 32 may be provided to rotate the arm about its horizontal axis. The end of arm 22 which projects over knee 24 is formed with a tongue 34 adapted to be telescoped and then bolted onto the yoke 36 of adapter 38 by bolt 40. Knee 24 is vertically adjustable on ways 42 with respect to the arm 22 and adapter 38. A screw jack 44 actuated by crank 46 is provided for effectuating such adjustment.

The conventional milling machine parts just described are fitted, according to the embodiment of the invention illustrated in the drawing, with a special combined tool and follower head attachment 48 bolted rigidly to the adapter 38, and with a special form of drive mechanism for moving the table 50 and the cross slide 52 longitudinally and transversely, respectively, relative to the tool and follower head attachment. The movements of the table, and consequently of the workpiece 54 and pattern 56 fastened thereto, are in a horizontal plane, or in a plane normal to the direction of movement of knee 24 on ways 42. Ordinarily, the angular adjustments of turret 26 and arm 22 are so made that when these parts are locked in place the tool 58 is fed toward and away from the work along an axis normal to the plane of movement of table 50; however, other angular settings of the head and tool relative to the table and workpiece may, of course, be used if desired. Once the head is locked in position the workpiece 54 and pattern 56 are moved simultaneously and equally during a machining operation longitudinally back and forth and also sideways, or transversely, with a scanning motion relative respectively to the tool 58 and follower 60 in a plane normal to the vertical ways 42. This scanning motion is automatically controlled electrically at electrically selected rates or increments of cross or transverse feed, and with a superimposed control responsive to the higher rates of follower feed, by the circuit shown in Figure 14. This circuit controls both the drive motor 62 of the cross slide 52 and the drive motor of the table 50. As the table moves the workpiece and the pattern with a scanning motion under the tool and the follower, the follower and tool are both reciprocated along parallel feeding axes whose angular position is determined by the setting of head 48. These tool and follower feed movements are effected by a motor 66 connected through infeeding (down) and outfeeding (up) electromagnetic clutches 68, 70 and thence through quill 72 to the tool spindle 74. Tool and follower feed clutches 68, 70 are controlled by the circuit of Figure 14 in such manner as to cause the follower 60 to follow exactly the surface contour of the pattern as the pattern moves thereunder, though in so doing the follower never actually touches the pattern, but is maintained at a substantially constant extremely small or minute spacing therefrom. Because the tool and follower are spaced a fixed distance apart on parallel axes and because they are interconnected by a follower arm 78 for simultaneous and equal feeding movements it will be apparent that the tool will be caused to describe a path relative to the workpiece exactly like that described by the follower as it follows the surface contour of the pattern, as the workpiece and pattern are moved by the carriage with simultaneous and equal scanning motions respectively under the tool and follower. Thus the tool 58, which has a cutting surface of the same size and shape as the pattern sensing surface of the follower (except that the follower preferably is smaller by a dimension equal to said constant small spacing) and which is separately driven for effecting metal removal by motor 80, will machine the workpiece to a surface of the same size and shape as that surface of the pattern scanned and sensed by the follower.

Figure 2:
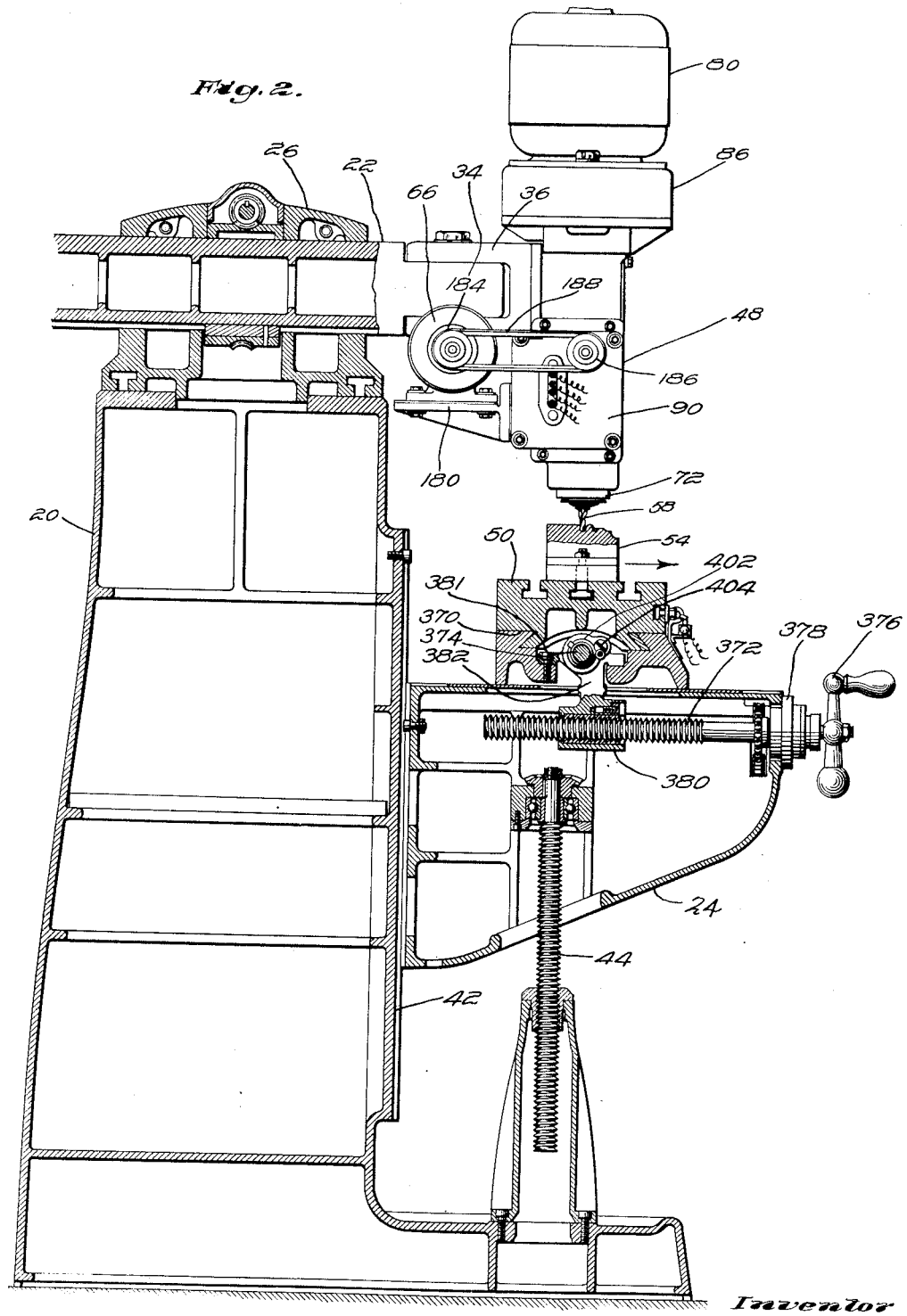
Figure 2 is a transverse view, partly in section, of the duplicating machine of Figure 1.
Figure 3:
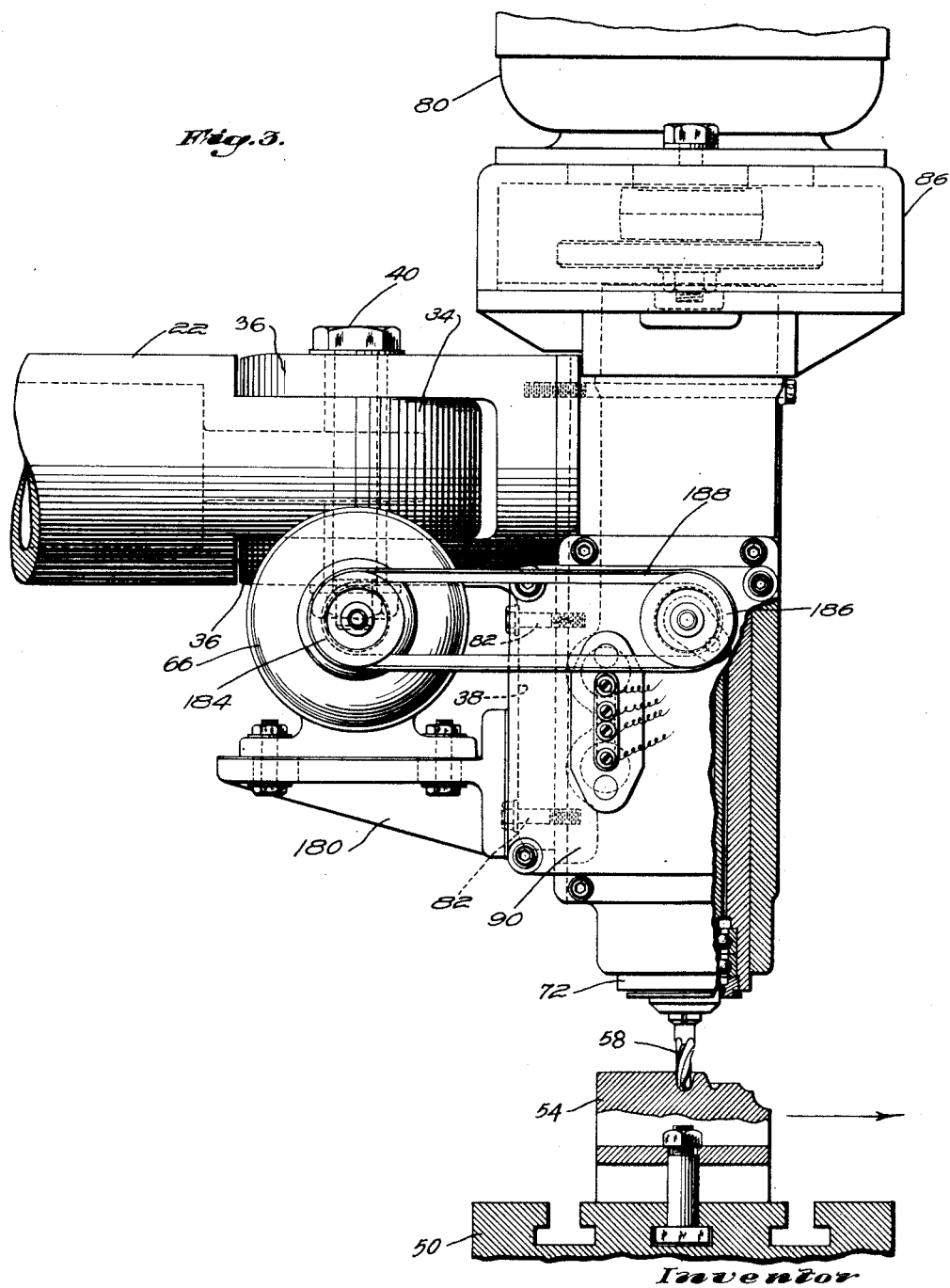
Figure 3 is a side view, partly in section, of the tool and follower head of Figure 2.
Figure 12:
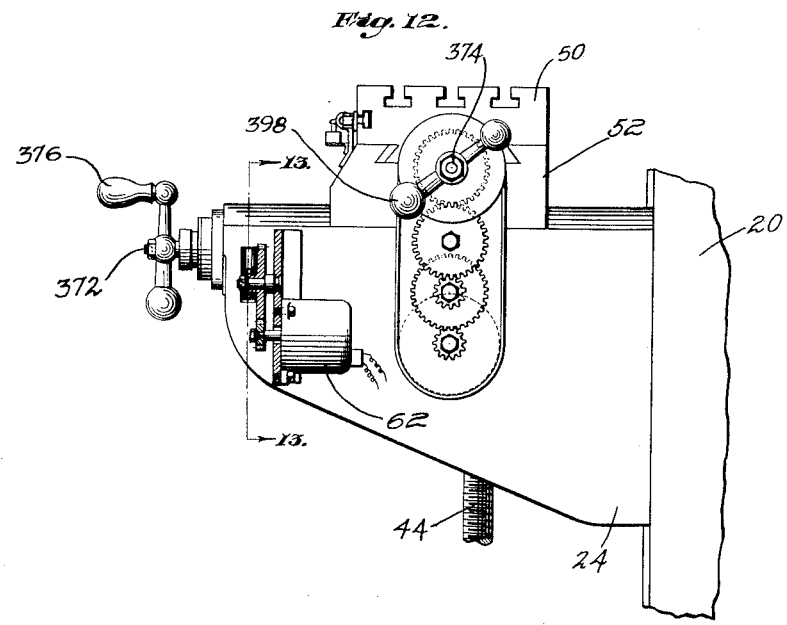
Figure 12 is a side view, partly in section, of the vertically adjustable knee, the cross slide, the table, and the cross slide feed and table feed drive mechanisms.
Figure 13:
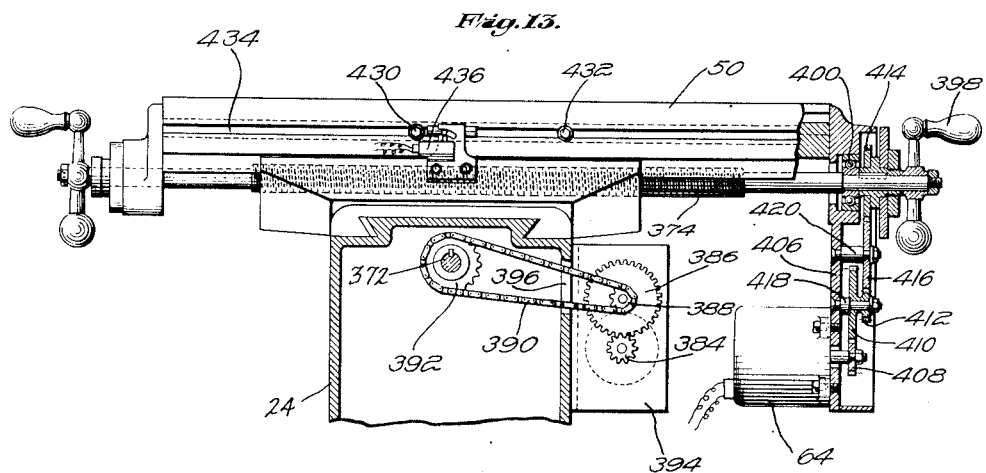
Figure 13 is a front view, partly in section, along the line 13 in Figure 12.

The specific construction of the tool and follower head attachment is shown in detail in Figures 1 to 11. This attachment provides for rotary cutting motion of the tool for metal removal, simultaneous and equal infeeding (down) and outfeeding (up) movements of the tool and follower relative respectively to the workpiece and the pattern, adjusting feed movements of the follower relative to the tool, and adjustable stop means for limiting the infeeding displacement of both tool and follower to a selected maximum depth.

The attachment is supported by the arm 22 to which it is rigidly fastened by adapter 38 bolted at 40 to the arm and at 82 to the generally tubular quill housing 84. The quill housing in turn serves to support the tool drive housing 86 secured to the top thereof, the follower housing 88 secured on the right side thereof (as viewed in Figure 5), and the clutch feed drive housing 90 secured to the left side thereof.

The quill housing has a cylindrical bore 92 in which the quill 72 is slidably, but non-rotatably mounted, for reciprocating tool feeding movements. The quill is fitted internally with antifriction bearings 96, 98 at each end thereof for rotatably supporting spindle 74. The inner bearing races are held in position on the spindle by a screw thimble 102 which locks the inner races of the upper and lower bearings and the spacer sleeve 104 therebetween firmly in place together, with the lower bearing race in abutment with shoulder 106 on spindle 74. A dust shield 108, is provided at the upper end of the quill. The outer races of both lower bearings 98 are clamped together within the internal quill recess 112 by screw thimble 114 and the bearings are so designed that such clamping preloads the balls against the races to provide for high speed vibration-free operation. The outer races of upper bearings 96 are also preloaded for the same reason, but by a spring pressed loading ring 116 biased upwardly against the outer bearing races by compression springs 118 bearing against a washer 120 on shoulder 122 of a recess in the upper end of the quill bore. Both the upper and lower bearings are of the thrust resisting type, locking the spindle to the quill for longitudinal feeding movement therewith while permitting free rotation of the spindle relative to the quill.

The lower end of the spindle, which protrudes from the lower end of the quill, is formed with a tapered internal bore 124 for receiving a collet 126. The collet is drawn into the tapered bore by a drawbar 128 extending through the spindle and having its lower end screwed into the collet and its upper end seated in a recess 130 in the top of the spindle. When the drawbar is rotated in a tightening direction by a wrench placed in the socket 132 thereof collet 126 is drawn into the tapered bore 124 to force the collet jaws into tight driving engagement with the tool, in this instance an end mill 58.

The upper end of spindle 74 is formed with a circumferential series of axial or longitudinal splines 134 slidably, but non-rotatably engaged with like internal splines 136 at the lower end of an intermediate shaft 138 driven by pulley 140. Intermediate shaft 138 is rotatably mounted in housing 84 by bearings 142, 144, the inner races of which are clamped together with the spacer sleeve 146 and the pulley 140 between the shoulder 148 and nut 150 on shaft 138. The outer races of bearings 142, 144 are located within recesses in opposite ends of a bushing 156 clamped within the upper end of the quill housing by a ring 158 bolted to the housing at 160. A dust shield ring 162 is provided below the lower bearing 144. Both bearings are preloaded by a loading ring 164 and compression springs 166 which act to bias the outer race of the upper bearing and the inner race of the lower bearing upwardly with respect to their companion races.

Tool drive motor 80 is carried on the tool drive housing 86 which telescopes over and is fastened to the upper end of the quill housing 84. The motor drives intermediate shaft 138 through V pulleys 170, 140 connected by V belt 174. A flat pulley 176 on the motor shaft and a flat step 178 on pulley 140 are also provided, for high spindle speed operation. Power from the drive motor is transmitted through pulley 140 and shaft 138 to spindle 74 by splines 134, 136, regardless of whether the quill and spindle be in a retracted position in which the shaft splines engage the lower end of the spindle splines or in an extended or protruded position in which the shaft splines engage the upper end of the spindle splines.

Quill 72 and spindle 74 carried thereby are extended out of the housing toward the workpiece or retracted into the housing away from the workpiece by the tool and follower feed motor 66 mounted on a bracket 180 carried by the clutch housing 90 bolted to the left side of the quill housing (as viewed in Figure 5). Motor 66 drives a pinion 182 through pulleys 184, 186 and a V belt 188. The pinion meshes with gear 190 on the drive housing 192 of upper clutch 68 (as viewed in Figure 5) and this clutch gear in turn meshes with a like gear 194 on the drive housing 196 of the lower clutch. Rotation of pinion 182 by motor 66 causes the driving elements or housings 192, 196 of both clutches to turn at equal speeds, but in opposite directions of rotation. Torque transmitted by the upper clutch 68 is applied to the splined driven clutch shaft 198 by the driven clutch plate 200 which is provided with internal splines engaging the external splines of shaft 198. The shaft splines are formed in the shape of gear teeth and thereby also serve as a pinion for driving layshaft gear 202 meshing therewith. A pinion 204 on a layshaft 206 driven by gear 202 engages a gear 207 on the quill drive shaft 208 and thereby drives the quill drive shaft pinion gear 210. This pinion meshes with a rack 212 on the rear side of the quill and exerts a thrust on the rack and quill tending to move the quill axially or longitudinally in housing 84 to provide a tool and follower feed movement either toward or away from the workpiece and pattern depending upon the direction of rotation of feed motor 66.

Torque transmitted by the lower clutch 70 is similarly but oppositely applied to the rack and the quill. The torque is applied to splined shaft 214 by the clutch plate or driven element 216. The splined shaft serves as a pinion for driving the layshaft gear 218 on the layshaft 220. Pinion 222 on the other end of the layshaft engages gear 224 on the lower quill drive shaft 226. The lower quill drive shaft carries a pinion 228 meshing with rack 212 and exerting a thrust thereon tending to drive the quill axially or longitudinally in housing 84 by the lower clutch 70 upon rotation of feed motor 66. However, the lower clutch and its associated gear train exert a thrust on the quill in the opposite direction to the thrust exerted by the upper clutch and its associated gear train. Thus the two clutches apply thrust simultaneously, but in opposite directions through separate or independent gear trains to the rack 212. If both clutches are continuously engaged regulated quill feed movements may be effected in either of the two opposite directions merely by controlling the slip of one clutch relative to the slip of the other clutch. This enables a highly sensitive, fast acting and extremely accurate control of quill feed motion to be obtained merely by varying the current flow through either clutch relative to the current flow through the other clutch. Backlash and play in the feed mechanism are constantly taken up because both drive mechanisms are continuously engaged, though in opposite directions. A change in the magnetic attraction between the driving and driven elements of either clutch is instantly reflected in a corresponding change in the thrust force applied by said clutch to the quill; the two clutch-controlled thrust forces on the quill are continuously acting and there are no intervening mechanical lags.

Both clutches are constructed in the same manner. A detailed view of the upper clutch is shown in Figure 11. The driving element is a cylindrical housing 192 of magnetic material such as iron rotatably mounted on shaft 230 by bearings 232, 234 and containing an annular recess for receiving a coil 236 wound around the axis of rotation of the housing. The high permeability path provided by the iron surrounding each cross-section of the coil is interrupted by an annulus 238 of non-magnetic material such as stainless steel, silver soldered within an annular gap 240 in the right hand end wall of the housing (as viewed in Figure 11). Flux created by coil 236 attempting to bridge this gap passes instead into the highly permeable driven clutch element 200 and from thence back into the housing on the other side of the gap. The clutch plate 200 is thus attracted more or less strongly to the end face of the housing depending on whether more or less flux is passing around the gap 240 through the plate. The effect is that of a pair of annular electromagnetic poles having end faces separated by the annular non-magnetic gap 240 and bridged by the magnetic clutch plate 200. The holding force of the electromagnet on the clutch plate and therefore the frictional driving force of the driving clutch element on the driven clutch element is varied as a function of the amount of flux created in housing 192 by coil 236 and this in turn varies with the current flowing through the coil. The slip of the clutch, or the speed of rotation of the driven element relative to the speed of rotation of the driving element, may therefore be regulated merely by controlling the current supplied to coil 236. Current is supplied to the coil by spring contactors 242, 244 connecting the terminals of the coil to slip rings 246, 248 secured against an insulating plate 250 on the left side wall of the housing by an insulating wedge ring 252 and bolts 254. Brushes 256, 258 bearing respectively against the slip rings feed current to the rotating coil from the external stationary contacts 260, 262. It will be seen that in the construction as described most of the clutch mass is concentrated in the driving element, which continuously rotates with the feed motor 66 at substantially constant speed. The variable speed clutch element or driven element is formed as a simple light iron clutch plate of low mass and hence low inertia, thus enabling inertia loads in the accelerating and decelerating portions of the mechanism to be kept to a minimum. The clutch plate is constantly attracted to the right side face of the clutch housing so that no reciprocating movement is involved in increasing or decreasing clutch slip; an increase in clutch current merely increases the attractive force between the driving and driven clutch faces and thereby increases the frictional forces therebetween to decrease the slip. To provide extreme smoothness of operation a porous paper lubricated sheet 264 (for example, a chemical filter paper of about .006 inch thickness, impregnated with a lubricant such as graphite is satisfactory for the purpose) is interposed between the opposed faces of the driving and driven clutch elements 192, 200. The clutch can then be operated continuously slipping, and to a degree closely regulated by the control of clutch current, without jerking, grabbing or chattering.

Follower arm 78 mounted in a housing 86 is attached to the quill 72 for reciprocating feeding movement therewith. The follower housing is bolted to the right hand side (as viewed in Figure 5) of the quill housing 84. It contains a vertical shaft 266 fixed within upper and lower bosses 268, 270 on an axis parallel to the longitudinal axis of the quill. The follower arm 78 is slidably mounted on shaft 266 by sleeve bearings 272, 274, for movement with quill 72 to which it is connected by a key and slot connection 276, 278. The key 276 is screwed into a hole in the side of the quill and the head of the key projects snugly within the slot 278 of a socket member 280 fastened to the left side of follower arm 78 by bolts 282, 283. The tubular housing 86 is cut away as shown at 284 to form an aperture enabling the follower arm to be connected to the quill as described and the aperture is elongated to permit longitudinal or reciprocatory movements of the quill and follower arm relative to the housing 86. Thus, quill movements are transmitted to the follower arm through the key 276 and socket member 280 as well as to the spindle 74 through bearings 96, 98, so that both the spindle and the follower arm move simultaneously and equally with each axial or longitudinal feeding movement of the quill.

The outer end of the follower arm is bifurcated as shown at 286, 288 to receive the follower shaft 290. This shaft carries a bushing 300 having a flange 302 around its upper end extending laterally beyond and resting upon the upper surfaces of the fingers 286, 288 on the end of the follower arm. The follower shaft is slidably mounted on a vertical axis within sleeve bearings 304, 306 at the upper and lower outer ends of the follower housing. Bushing 300 is slidably mounted on the follower shaft, being prevented, however, from movement upwardly along the shaft beyond a selected point determined by the position of the lower end of adjustable stop shaft 308. This shaft forms an upper stop pin 310 which extends through slots 312, 314 in the follower shaft wall and which has its ends fastened in diametrically opposed holes in the bushing near the lower end thereof. Stop shaft 308 is fixed to the end of a micrometer spindle 316, adjustable vertically in the micrometer barrel 318 by rotation of micrometer thimble 320. The micrometer barrel is press-fitted into the upper end of the tubular follower shaft 290 to provide a rigid or fixed connection therebetween. Weight of the shaft 290 (which slides freely through bearings 304, 306) is therefore transmitted to barrel 318, to spindle 316, to stop shaft 308 and thence by way of pin 310, bushing 300 and flange 302 to the follower arm fingers 286, 288. Thus the weight of the follower shaft assembly causes flange 302 to remain in contact with the upper surface of fingers 286, 288 during both up and down movements of the follower arm, and the follower shaft is maintained in that position relative to the quill determined by the adjustment of stop shaft 308. However, this is true only during normal operation, when the follower 60 itself takes no load; if due to some abnormal condition a load or force were imposed upwardly on the follower it would merely lift the shaft 290 and possible also the bushing 300, thus displacing the follower shaft upwardly relative to the follower arm and thereby providing a safety or release action which prevents damage to the follower and/or the pattern whose form it is sensing. Under ordinary conditions the weight of the assembly is entirely supported by flange 302 bearing on fingers 286, 288 but if for any reason an upward thrust is imposed on the follower shaft it is free to move upwardly if the thrust overcomes its weight, without restraint or hinderance by follower arm 78.

Two adjustments are provided for the follower shaft. The mechanical adjustment of stop shaft 308 by screwing spindle 316 in and out of micrometer barrel 318 enables fine adjustments to be made of the position of pin 310, and consequently of the vertical position of shaft 290, relative to follower arm 78. A second depth stop adjustment is shown at 322, 324 for electrically limiting the downward movement of the follower shaft and quill to a selected depth. Flange 322 secured to the top of shaft 290 has an electrode point 324 thereon which sparks to the upper contact surface of a micrometer screw 326 fastened to the follower housing 88 when the shaft 290 is lowered in the housing to a predetermined maximum depth. This depth is readily selected by rotation of micrometer nut 328 threaded on screw 326 and held longitudinally between two flanges 330, 332 fastened to the follower housing underneath the contact 324. When the nut is turned the screw is moved up or down through smooth cylindrical holes in flanges 330, 332 on opposite sides of the nut. At least one of these holes has a protuberance or key 336 on the wall thereof which fits into longitudinal slot 338 in the screw and thereby prevents rotation of the screw while permitting axial or longitudinal adjusting movement thereof, in response to rotation of the nut. A spring clip 340 is interposed between the lower flange 332 and the nut, to eliminate play and maintain a constant biasing thrust on the screw threads of the nut and screw. Electrical lead 342 is connected to the electrode point, and this lead transmits a signal when the point approaches within a very short predetermined distance from the screw, which is effective in a manner later to be described to prevent further feeding movement of the follower and quill toward the work beyond a depth determined by the said selected position of point 324 and screw 326.

Follower 60 is mounted within an insulating sleeve 346 within the lower end of tubular shaft 290. Compression bushings at each end of the sleeve are forced inwardly by tightening of the screw thimble 348 to grip the follower and thereby lock it in fixed insulated position relative to the shaft. The lower end of the follower projects downwardly beyond the lower end of shaft 290 by a distance sufficient to reach into the lowermost recesses or depressions in the surface of the pattern whose form is to be sensed. The upper end of the follower bears against contact point 349, which is riveted firmly into lining 362. The contact point is connected by very short leads 350, 352 to resistors 586, 604 which in turn are connected to lines 588, 606 leading to the control circuit of Figure 14. The follower, leads 350, 352, resistors 586, 604 and wires 588, 606 are all completely electrically insulated from the follower shaft and its associated parts by sleeve 346 and by an insulating lining 362 within the shaft above the sleeve. An insulating grommet 364 is provided where the wires 588, 606 pass through the shaft wall. A compression spring 366, which preferably has a rubber coating so that it serves also as insulation, forces lining 362 downward, thereby holding contact point 349 against the upper end of follower 60.

Table 50 to which both workpiece 54 and pattern 56 are fastened is movable in three dimensions. It can be adjusted relative to the tool and follower head 48 along a vertical axis by crank 46 which actuates the jack 44 to shift the knee 24 up or down on ways 42. Once adjusted to the proper vertical position in this manner the knee is locked in place by a clamp partially shown at 367 in Figure 1 and subsequent movements of the table are limited to a horizontal plane, either transversely on the cross slide ways 368 or longitudinally on the table ways 370. Lead screws 372 and 374 may be operated either manually or automatically to shift the cross slide and table respectively along the ways 368, 370.

Manual operation of the cross-slide lead screw 372 is effected by a crank 376 fixed to the screw and which can be turned by hand to rotate the screw in a ball thrust bearing (not shown) in housing 378. The outer race of the bearing is fixed to the knee and the inner race to the lead screw to prevent axial movement of the screw while permitting rotation thereof. Consequently, when the screw 372 is rotated the nut 380 threaded thereon is moved axially therealong, in one or the other transverse direction, causing the cross-slide 52 bolted at 381 to a bracket 382 integral with the nut to slide transversely on ways 368. Automatic operation of the cross-slide lead screw 372 is effected by motor 62 controlled by the circuit of Figure 14. This motor, which is reversible to move the cross-slide in either direction, is drivingly connected to the screw through a speed reducing train comprising a motor pinion 384 which meshes with an intermediate gear 386 that drives a sprocket 388 connected through chain belt 390 to a sprocket 392 keyed to the lead screw. Motor 62 and the shafts on which the gears and drive sprocket of the reducing train are mounted are carried by a casing 394 fixed to the side of knee 24. An aperture 396 in the knee side wall is provided to enable the chain-belt to pass therethrough.

Manual operation of the table lead screw 374 is effected by a crank 398 fixed to the screw and which can be turned by hand to rotate the screw in ball thrust bearing 400. The outer race of this bearing is fixed to the table and the inner race is fixed to the screw to prevent axial movement of the screw relative to the table while permitting rotation thereof. The screw is threaded into a nut 402 fastened by bolt 404 to bracket 382 on the cross-slide nut 380. Consequently, when the table lead screw is rotated it is moved axially in one or the other direction through the nut 402 and causes table 50 to slide longitudinally on ways 370. Automatic operation of the table lead screw 374 is effected by table drive motor 64 carried by an apron 406 which depends from one end of the table 50. This motor, which is reversible to move the table in either direction, is drivingly connected to the table lead screw through a speed reducing train comprising a motor pinion 408 meshing with an intermediate pinion 412 connected to the lead screw drive gear 414 through an idler gear 416. The shafts 418, 420 on which the intermediate and idler gears are mounted are supported by apron 406.

*Operation and control*

The pattern 56 to be reproduced is placed on table 50, and if desired fastened thereto in any convenient manner, in a position such that the longitudinal boundaries of the pattern lie within the limits of the range of relative longitudinal movement of the table and follower. Workpiece 54 is similarly positioned with respect to the tool and fastened in such position by clamps 422, 424 secured with bolts 426, 428. Thus, when the table is operated to cause the pattern to move longitudinally back and forth under the follower the workpiece will be moved identically back and forth under the tool. Both the pattern and workpiece are also within the range of transverse movement of the cross-slide relative to the tool and follower. Thus, when the table is shifted transversely by movement of the cross slide on ways 368 the workpiece and pattern will be moved identically under the tool and follower in a transverse direction. Any vertical adjustment that may be necessary is made by shifting knee 24 on ways 42 and then clamping the knee in an adjusted position in which the range of feeding movement of the cutting and sensing surfaces respectively on the tool and follower encompasses the vertical boundaries of the pattern surface to be reproduced.

The surface of revolution formed by the cutting edges of the tool should be of exactly the same shape and size as the sensing surface of the follower (except that the dimensions of the follower sensing surface should be smaller by an amount equal to the spacing maintained between the follower and the pattern). An accurate and simple way of accomplishing such result is to machine a hole in a metal block with the particular tool to be used and then to pour molten metal in the mold so formed to produce a casting in the shape of a tracer rod or stylus particularly adapted for finishing to size for use as a follower in combination with said tool.

When the pattern and workpiece have been properly positioned and fastened to the table, with tool 58 and follower 60 fixed in identical positions in the tool spindle 74 and follower spindle 290, respectively, the reversing lugs 430, 432 are shifted to and then locked in those selected positions in the table side channel 434 at which the reversing switch 436 is actuated by the lugs at the predetermined or desired limits of longitudinal table movement.

The electrical connections to the cross slide motor, the table motor, the tool and follower feed motor, and the reversing switch 436 are, of course, so made that they will be operated in the correct sense to perform the functions described herein and illustrated in the wiring diagram of Figure 14. As shown in this figure, the main control circuit for the whole machine comprises three interconnected component circuits having the following primary functions: a table feeds circuit indicated by the dotted outline 438 for controlling the horizontal longitudinal and transverse motions of the table and cross slide, a clutch control circuit indicated by the dotted outline 440 for controlling the vertical motion of the quill (and the tool and follower attached thereto), and a power supply circuit indicated by the dotted outline 442 for furnishing electrical current at the various potentials required. All three component circuits are energized from a single source of alternating current, for example, a 110 volt 60 cycle power supply line. A safety switch mechanism operated by a solenoid 444 across the power line is provided to guard against power failures, as shown at the left in Figure 14.

Once the set-up is completed the double pole single throw main switch 446 is closed, applying power from the main 110 v. 60 cycle supply line 448, 450 to the primary winding 452 of the power supply transformer and also to the motor supply line Y which is directly connected to the common terminal of the two reversing windings of the reversible table feed motor 64. Line Y is also similarly connected directly to the common terminal of the two reversing windings of the reversible cross slide feed motor 62. Reset button 454 is then closed, energizing relay 456 to close switch 458 and apply power from the other main power line to the motor supply line Z. Once the switch 458 is closed in this manner it will be held closed by current passing through the shunt 460 until the main switch 446 is opened, unless some other interruption occurs in the supply of power which would also release the solenoid of the relay and cause the biasing means therein (not shown) to open switch 458 and prevent further current flow through line Z. This safety action prevents possible damage to the workpiece or pattern by accidental stopping and starting of the machining operation due to momentary power failures. If a power interruption occurs both motors 62, 64 not only stop, but cannot be restarted until the reset button 454 is deliberately closed.

When safety switch 458 is closed, alternating current at 110 v. 60 cycles is fed through line Z to the terminal 462, from whence a circuit is completed through relay 464 and reversing switch 436 connected in series across the lines Y and Z by leads 465, 466 and 468. When reversing switch 436 is closed the relay 464 is energized and the solenoid thereof is pulled downwardly against the biasing means (not shown) of the relay to move switch 470 to its lower position, and when the reversing switch 436 is open the relay is deenergized and the biasing means therein moves the switch 470 to its upper position.

The reversing switch preferably comprises a micro-switch actuated by the adjustable stop lugs 430, 432 on the side face of the table. When the table reaches the end of its selected range of longitudinal travel to the right (as viewed in Figure 4) lug 430 strikes a cylindrical plunger 472 slidably mounted in a bore through bracket 474 secured to the end face of the cross slide, on which the bracket 474 is mounted. This exerts a thrust force on the plunger, causing it to slide through the bore. As the plunger is shifted axially in the bore by the thrust force so exerted thereon it is caused to turn by pin 476 which projects laterally from the plunger through a cam slot 478 in the side wall of the bore. This turning movement forces the outer projecting end of the pin downwardly against the operating lever 480 of the micro-switch and opens or closes the switch as the case may be. A like action occurs when the table moves to the left sufficiently to bring the right hand lug 432 in contact with the other end of plunger 472, except that in this instance pin 476 is lifted by the cam slot from the switch lever 480 enabling the biasing means therein (not shown) to close or open the switch, as the case may be. At the end of one direction of table movement the micro-switch is closed, while at the end of the other direction of table movement the micro-switch is opened. In either case relay 464 is operated simultaneously with the opening or closing of the micro-switch, to move switch 470 to its alternate position.

Power from the terminal 462 of the motor supply line Z is also fed through switch 482 of a fast acting relay 484, actuated by the clutch control circuit in a manner later to be described, to a switch 486 operated by a sensitive relay 488. Switch 486 has two closed positions. In its upper position power from line Z (assuming switch 482 is closed) is fed through the leads 490, 492 (containing a manually operated switch 494) to the switch 470 of the 110 volt relay 464. The current then flows through lead 496 or lead 498 to one or the other of the two terminals of table feed motor 64, depending on whether the switch 470 is in its up position or its down position, respectively. The circuit is, of course, completed through the particular winding so energized as a result of its connection through the common terminal of both windings to power supply line Y. Thus, one or the other of the two windings of motor 64 is energized by current in phase with the power source. The winding which is not so connected to the power source is energized by an advanced phase current flowing in phase shifting condenser 500 and resistor 502. The motor is so wound that its direction of rotation depends on the relative phase of the currents in its windings. Therefore, when the reversing switch 436 is closed at one end of the selected range of table travel it will, by the resultant shift of switch 470, cause the table feed motor to reverse and thereby reverse the direction of table motion; when switch 436 is subsequently opened at the other end of the selected range of table travel it will by the resultant shift of switch 470 again reverse the table feed motor and cause the table to return again to its original direction of movement. This action, if it were not stopped by an interruption of power or altered by the action of the fast acting relay 484 or the sensitive relay 488, would continue indefinitely. The table would merely move back and forth along a single line between limits determined by the position of the adjustable lugs 430, 432, at a speed determined by the ratio of the reduction gear drive between motor 64 and table lead screw 374.

However, it is necessary in order to reproduce the form of a surface to have the follower pass over the whole of said surface, and the fineness or detail of the reproduction will be dependent to a large extent upon the number of surface points whose position is sensed by the follower. Therefore, a traversing motion effected by the cross slide is superimposed upon the longitudinal table motion previously described, preferably in such a manner that the relative motion of the table and follower (and of the table and tool)

will be a scanning movement, for instance as a series of very closely spaced parallel lines. This may be accomplished manually, by the hand crank 376 or by manual actuation of the selector switch 504. It may also be accomplished automatically through the action of the sensitive relay 488.

Manual actuation of the selector switch 504 can be used to effect manual control of the cross slide feed motor 62. When this selector switch is in its left hand position, connecting lead 506 with lead 508, power is fed from terminal 462 of line Z, through the switch 482 of the fast acting relay, lead 490, lead 506, selector switch 504, lead 508, reverse switch 510, and lead 512 connected to one of the two reversing windings of motor 62. The circuit is completed through lead 514 which connects the common terminal of the motor windings to the power line Y, and the motor is caused to operate in a first direction of rotation to cause the cross slide to be shifted transversely in a corresponding direction along the ways 368. Manual operation of the slide (and consequently the table carried thereon) in the opposite sense is effected merely by throwing the reverse switch 510 to its opposed or right hand position, in which lead 508 is connected to lead 516 so as to reverse the relation of current phases in the respective motor windings and cause motor 62 to operate in the opposite direction of rotation. Motor 62 is of the conventional reversing type having two windings which can be energized out of phase with each other to cause the motor to operate in either direction of rotation. A phase shifting network comprising a capacitor 518 and a resistor 520 may be provided for reversing purposes, in a conventional manner. It will be seen that manual operation of the cross slide in this manner, either mechanically by crank 376 or electrically by manually operated switches 504 and 510, can be effected either continuously or intermittently, at any time. The direction of transverse feed can be selected by reversing switch 510 when manually controlled electrical feed is being used, the duration of the feed being controlled by the time period during which switch 504 is held in its left hand closed position. The speed of transverse feed will, of course, be at a rate determined by the ratio of the speed reducing train connecting the cross slide lead screw with motor 62. This assumes that cross slide motor 62, like table motor 64, is a substantially constant speed motor, which preferably is the case.

Cross feed selector switch 504 can also be placed in a right hand closed position and a vertical open position, as well as in the left hand closed position referred to above for manual electrical cross slide operation. When in the vertical or open position the switch completely cuts off the flow of current to motor 62 and there can be no operation of the cross slide except mechanically by turning crank 376. Condenser 522, like condensers 524 and 526, are blocking condensers which permit no current flow except momentarily when the switches are opened or closed to eliminate arcing at the switch contact points. Current can flow to lead 508 only through switch 504 and then only from lead 506 when the selector switch is in its left hand closed manual position, or only from leads 490, 528 through switch 486 when the selector switch 504 is in its right hand closed automatic position.

In the automatic or right hand position of selector switch 504 power from line Z fed to switch 486 through lead 490 is caused to flow either to the table motor 64 through lead 492 and switch 470 or to the cross slide motor 62 through lead 528 and switch 504, and never to both motors at once. When switch 486 is in its lower position the current from line Z is fed to the cross-slide motor 62 and when the switch is in its upper position the current is fed to the table motor 64. Thus, switch 486 acts selectively to operate either the longitudinal table feed or the transverse cross slide feed, depending upon whether or not the sensitive relay 488 is energized.

Energization of relay 488 is effected in timed relation to the reversals of the longitudinal table motion by a time delay circuit including a twin triode vacuum tube 530 having two control grids 532, 534 connected through condensers 549 and 547 respectively to the upper and lower contact points of a switch 536 actuated by the same arm 537 that actuates switch 470 of relay 464. Thus, when the reversing switch 436 energizes or deenergizes relay 464 switch 536 is moved to a lower or upper closed position, respectively, simultaneously with the switch 470. In its lower position, switch 536 connects the plus 350 v. direct current supply line 538 (supplied by the vacuum rectifier 540 and a filter circuit comprising condensers 542, 544 and inductance 546) through a condenser 547 to the right hand control grid 534 of the tube 530. In its upper position, switch 536 connects line 539 through a condenser 549 with the left hand control grid 532 of tube 530. A resistor 548 is preferably included in the line 538.

The anodes or plates 550, 552 of tube 530 are connected through a resistor 554 to the 350 v. D. C. line 538. The cathodes 556, 558 are connected by leads 560, 562 to a line 564 connected to ground through the solenoid winding of the sensitive relay 488. The two leads 566, 568 leading respectively to condensers 547, 549 are connected to ground through fixed resistors 570, 572; the other sides of condensers 547, 549 are also connected to ground through variable resistors 574, 576. The tube is, of course, provided with a heater 578 supplied from a secondary winding 580 on the power supply transformer in the usual manner.

It will be seen that when switch 536 is suddenly moved by energization of relay 464 to its lower position direct current starts to flow from line 538 through switch 536 to the condenser 547. During the time the condenser is thus being charged, current flows through the variable resistor 574, creating a direct current voltage drop across the resistor in an amount that can be selected by adjustment of the variable contact 582. This causes the grid 534 to go positive relative to ground potential by a voltage equal to the drop across resistor 574, resulting in an increase in the current flow between the right hand tube elements 558, 552 and through the line 564 and relay 488. The relay 488 is so designed and adjusted that it will hold the switch 486 in its lower closed position whenever the current flow through the line 564 exceeds a predetermined minimum current level. The circuit is so designed that the increase in current flow through line 564 resulting from a movement of switch 536 to its lower position raises the current flow through the solenoid winding of relay 488 above said predetermined minimum level and maintains said current flow above said level for a time period dependent upon the setting of the movable contact 582 of the variable resistor 574 and upon the capacitance of condenser 547. As condenser 547 becomes charged the current flow through resistor 574 and consequently the potential applied to grid 534 becomes less and less until a point is reached at which the flow of current through the tube by way of leads 562, 564 drops below said predetermined minimum level, enabling the biasing means in relay 488 to raise switch 486 to its upper position. Finally, condenser 547 becomes fully charged and the grid 534 will be at ground potential. Though some current may still flow between tube elements 552, 558 under such conditions it will be below said predetermined current level and will be insufficient to energize the relay 488.

Movement of switch 536 to its opposite, or upper, position similarly acts on the grid 532 to increase the current flow between cathode 556 and plate 550, during a time period determined by the setting of the movable contact 584 of the variable resistor 576 and by the capacitance of condenser 549. As a result the current flow through relay 488 by way of leads 560, 564 is increased above said predetermined minimum level during a portion of the period in which the condenser 549 is charging, and such energization of the relay maintains switch 486 in its lower closed position during said portion of the condenser charging period. As before, the length of time during which the relay 488 is energized so as to hold switch 486 in its lower position can be selected simply by varying the effective value of resistor 576 through adjustment of movable contact 584.

When the connection between line 538 and condenser 547 is broken by movement of switch 536 from its lower to upper position, condenser 547 will then discharge to ground through the resistor 570, whereby it will again be in condition to be charged as described above when switch 536 is returned to its lower position. Condenser 549 will be similarly discharged through resistor 572 when the connection from line 538 to condenser 549 is broken by movement of switch 536 from its upper to its lower position, whereby it will again be in condition to be charged as described upon return of switch 536 to its upper position.

Summarizing the operation of the table feeds circuit, motor 64 moves table 50 in a first direction when relay 488 is deenergized and switch 486 is in its upper position. Switch 436 will be closed upon completion of the table stroke, energizing relay 464 to move switches 470, 536 simultaneously to their lower closed positions. This at once connects the motor 64 for table operation in the reverse direction and prevents such operation by simultaneously breaking the circuit to the table feed motor through the movement of switch 486 to its lower closed position in response to energization of relay 488 as a result of the signal maintained on grid 534 of tube 530 during a predetermined time period immediately following the said closing of switch 536. While switch 486 is thus held in its lower closed position the motor 62 will be operated to feed the cross slide and table transversely in a direction determined by the position of switch 510. After a time delay predetermined by the setting of variable resistor 574 the current flow through relay 488 will have decreased sufficiently to enable the relay bias to move switch 486 to its upper position. This breaks the circuit to the motor 62 (assuming switch 504 to be in its automatic or right hand position) and reestablishes the circuit to the motor 64. The result is that the table moves longitudinally to one end of its stroke, stops, is fed transversely by movement of the cross slide in a direction selected by switch 510 during a time period selected by the variable resistor 574, and then is again moved longitudinally but in the opposite direction. A like sequence of events occurs at the other end of the stroke except that there the switch 436 is opened rather than closed and except that the traverse control is through variable resistor 576 rather than resistor 574. Thus, the follower and tool are caused to scan the surfaces of the pattern and workpiece, by relative movement thereof back and forth in a horizontal plane along parallel spaced lines, the spacing of which lines can be varied at will by adjustment of resistors 574, 576. Because the settings of variable resistors 574, 576 may be separately adjusted, the transverse table feed at the end of each longitudinal table stroke may be varied independently of the transverse table feed at the end of the opposite table stroke. As before stated, the speed of cross slide motion is preferably constant; therefore the amount of transverse feed or the distance through which the cross slide moves transversely at the end of a table stroke will be determined by the time period or duration of cross slide movement. This time period can be established between zero time for the setting of contact 582 or contact 584 in which a minimum resistance value is interposed between ground and the grid side of condenser 547 or condenser 549, up to a maximum time period for the setting of contact 582 or contact 584 in which a maximum resistance value is interposed between ground and the grid side of condenser 547 or condenser 549.

As the follower and tool are caused to scan the respective surfaces of the pattern and workpiece the clutch control circuit causes the follower to move vertically at rates of motion in both directions of travel necessary to cause the sensing surface of the follower to be maintained at a very small substantially constant selected spacing, or gap, from the surface of the pattern. For example, the clutch control circuit may be designed and adjusted to cause the follower to be maintained at a constant spacing of about .0015 inch from the pattern surface, for a machine of the type shown in the drawing. It can, of course, be designed and adjusted to maintain other predetermined constant spacings. For instance, for large machines it can be set to maintain a constant spacing of about .003 inch and in smaller machines a spacing of about .0005 or even less. Where larger constant spacings of a value greater than about .003 are desired a higher voltage power source for creating the follower signal preferably is used.

Clutch control circuit 440 operates on the same principle as the clutch control circuits shown and described in my prior application S. N. 65,052, filed December 13, 1948. The sensing surface of the follower 60 is connected through a resistor 586 by leads 588, 590 to the +1000 v. D. C. line of the power supply circuit 442. This D. C. line is supplied with power by the vacuum rectifier 592 and a filter circuit comprising condensers 594, 596 and inductance 598. Pattern 56 is grounded, as shown at 600, so that at open circuit (no spark or current flow between follower 60 and pattern 56) a D. C. potential of approximately 1000 v. is continuously maintained across the gap between the follower and pattern. Upon approach of the follower into sufficiently close proximity with the pattern the air gap therebetween is broken down by the 1000 v. D. C. potential and a spark is established therebetween. It is believed that the air in the gap between the follower and the pattern becomes ionized as the gap breaks down and current starts to flow, and that the current of the spark is carried by the ionized air. Whatever the reason, it has been found that once the spark is established (which usually occurs with a construction such as illustrated in the drawing at slightly more than .003 inch) it will be maintained substantially continuously with a current flow across the gap that varies as a function of gap length. Because of the relatively large value of the resistance 586 such current flow never reaches a very large value—it is still of the order of tens of microamperes even under short circuit conditions, i. e. when the follower is deliberately placed into actual physical contact with the pattern. Consequently the discharge across the gap is under all operating conditions a spark type discharge of a small current at high voltage across a short air gap, with no melting or fusing or burning such as might occur with large currents. The pattern and follower surfaces can therefore be composed of almost any conductive material. A metal follower has been found highly satisfactory, for instance of steel, brass, or low fusing non-shrinking lead or bismuth alloys. The pattern, for example, may be merely a moist plaster of Paris; a modeling or casting wax coated or covered with an electrically conductive paint, paste or liquid; or it too may be composed of metal.

As the spark current flows across the gap between the follower and the pattern a voltage drop is produced across resistor 586 which varies with said current flow. Therefore, a signal potential is established on the follower which will vary as a function of the length of the spark, or as a function of the air gap between the follower and pattern at their points of closest proximity. This signal potential is transmitted by lead 602 through resistor 604 and lead 606 to control grid 608 of the triode vacuum tube 610, which is connected in a cathode follower circuit including resistor 612, cathode 614 and anode 616. The tube contains a heater 618 supplied from a secondary winding 620 of the power supply transformer in the usual manner. Cathode 614 is connected to ground through the resistor 612, and anode 616 is connected to the +1000 v. D. C. line 500 through lead 622. With this arrangement, a change in the potential on grid 608, such as would result from a signal transmitted from follower 60 through lead 602 and resistor 604 to the grid, results in a corresponding change in the current flow through the tube between the cathode and anode thereof. This in turn creates a corresponding change in the voltage drop across resistor 612. The effect is to produce a signal in lead 626 (connected to the cathode) whose voltage is a function of the initiating signal produced on the follower, but whose current is at a higher level. The voltage on the cathode of tube 610 is transmitted through lead 626 to a condenser 628, the other side of which is connected through lead 638 and resistor 640 to ground. As the voltage on the cathode of tube 610 varies, due to varying current flow through the tube, the charge on the plates of condenser 628 tends to vary accordingly, and current therefore flows between the condenser and ground through resistor 640 at a rate proportional to the rate of change of charge in condenser 628. The voltage drop across resistor 640 due to current flow between condenser 628 and ground thus causes the voltage on lead 638 to be substantially proportional to the rate of change of voltage on the cathode of tube 610.

The voltage on lead 638 is applied to a second condenser 630, the other side of which is connected through lead 644 and resistor 642 and lead 624 to the adjustable contact 623 on resistor 612. As the voltage on lead 638 varies, the charge on the plates of condenser 630 tends to vary accordingly, and current flows through lead 644 and resistor 642 at a rate which is substantially proportional to the rate of change of charge on the plates of the condenser 630, and also proportional, therefore, to the rate of change of voltage on lead 638 between condensers 628 and 630. It will be seen that, since the voltage on lead 638 is proportional to the rate of change of voltage on the cathode of tube 610, then the current flowing in lead 644 and resistor 642 must be substantially proportional to the rate of change of cathode voltage on tube 610. Furthermore, since the cathode voltage of tube 610 is substantially proportional to the length of gap between follower 60 and pattern 56, then the current flowing in lead 644 and resistor 642 is substantially proportional to the acceleration of the length of said gap.

The current which flows in lead 644 and resistor 642 also flows through lead 624 and adjustable contact 623 and through that portion of resistor 612 between contact 623 and ground.

The voltage on lead 644 is equal at any instant to the algebraic sum of the voltage drop due to the flow of cathode current from tube 610 through that portion of resistor 612 between contact 623 and ground, plus the voltage drop due to the current which is flowing through resistor 642 and that portion of resistor 612 between contact 623 and ground. Since the cathode current in tube 610 is a function of the length of gap between the pattern and follower, and since the current in resistor 642 is a function of the acceleration of said gap, then the voltage on lead 644 is at any instant a function of both the length and the acceleration of the gap between follower 60 and pattern 56.

The voltage on lead 644 is transmitted through lead 632 to the control grid 634 of triode vacuum tube 636. The anode 656 of tube 636 is connected through resistor 646 and lead 648 to the plus 350 volt D. C. line of the power supply circuit 442; and the anode is also connected through lead 658 and resistor 660 to the minus 350 volt D. C. line of the power supply circuit. The plus 350 volt D. C. power is preferably supplied in the usual manner by vacuum rectifier tube 540 and a filter circuit comprising condensers 542, 544 and inductance 546. Similarly, the minus 350 volt D. C. power preferably is supplied by vacuum rectifier tube 662 and a filter circuit comprising condensers 664, 666 and inductance 668. The cathode of tube 636 is connected through a resistor 650 to ground and the cathode is also connected through lead 670 and resistor 672 to the minus 350 volt D. C. line of power supply circuit 442.

A change in the potential on the grid 634 of tube 636, such as would result from a change in the voltage in lead 632 connected thereto, causes a corresponding change in the current flowing through the tube between the anode and the cathode thereof. Such a change in current flow in the tube causes a corresponding change in the current flowing in resistor 646 and resistor 650 connected respectively to the anode and cathode of the tube. The resulting voltage drops across these resistors appear as changes in the potentials on the anode and cathode of tube 636, the cathode voltage changing in the same direction as the applied grid voltage and the anode voltage changing in the opposite direction. For example, an increase in the voltage on grid 634, such as would result from an increase in the gap between follower 60 and pattern 56, would cause an increased current flow through tube 636 with a corresponding increase in voltage on cathode 652 and a decrease in voltage on anode 656.

A change in the voltage on anode 656 and on lead 658 connecting the anode to resistor 660 causes a corresponding, but smaller, change in the potential on contact 674 on resistor 660. Similarly, though in opposite phase, a change in the voltage on cathode 652 and on lead 670, connecting the cathode to resistor 672, causes a corresponding, but smaller, change in the potential on contact 676 on resistor 672. Resistors 660, 672 preferably have high values of resistance relative to resistors 648 and 650 so that current flowing in them will have little influence on anode and cathode potentials in tube 636. The positions of contacts 674, 676 preferably are so chosen on their respective resistors 660, 672 that during operation of the machine, their potentials will vary within approximately equal ranges slightly below ground potential.

The potential of contact 674 is transmitted by lead 678 to one control grid 680 of twin triode vacuum tube 682, where it controls the flow of current between anode 696 and cathode 688. Similarly the potential of contact 676 is transmitted by lead 684 to the other control grid 686 of tube 682, where it controls the current flowing between anode 698 and cathode 690. Both cathodes are connected to ground by leads 692, 694. Anode 696 is connected in series with milliammeter 700 and the outfeeding electromagnetic clutch 70 to lead 702; anode 698 is connected in series with milliammeter 706 and infeeding electromatic clutch 68 to lead 702, which connects the common side of both clutches through the coil of fast acting relay 484 and lead 648 to the plus 350 volt D. C. line of power supply circuit 642. As the potential of grid 680 varies, due to variation in the voltage on contact 674 connected thereto, a corresponding change in current occurs in the series circuit between lead 702 and ground, comprising the space between cathode 688 and anode 696, milliammeter 700, and clutch 70. For example, an increase in voltage on contact 674 and grid 680 connected thereto such as would result from a decrease in the gap between follower 60 and pattern 56, causes an increase in the flow of current from lead 702 through outfeeding clutch 70, milliammeter 700, and across the space between anode 696 and cathode 688 to ground. Conversely, a decrease in voltage on grid 680, such as would be caused by the follower moving away from the pattern, causes a corresponding decrease in current flow through outfeeding clutch 70 and milliammeter 700; and by proper selection of the position of contact 674 on resistor 660, the current flow through clutch 70 and milliammeter 700 preferably is reduced to zero when the follower moves beyond a certain predetermined distance from the pattern.

In a similar manner, but in opposite phase, a variation in the potential on grid 686 of tube 682 due to variation in the potential of contact 676 connected thereto causes a corresponding variation in the current flow through infeeding clutch 68 and milliammeter 706. For example, a decrease in the voltage on contact 676, such as would result from a decrease in the gap between follower 60 and pattern 56, causes a decrease in current flow through infeeding clutch 68 and milliammeter 706; and by proper selection of the position of contact 676 on resistor 672 the current in clutch 68 preferably is reduced to zero when the follower approaches the pattern nearer than a certain predetermined minimum space. Conversely an increase in the voltage on contact 676 such as would be caused by an increase in the gap between the follower and pattern causes an increased current to flow in infeeding clutch 68 and milliammeter 706.

The total current flowing in both clutches 68, 70 passes from the plus 350 volt D. C. line of the power supply circuit through lead 648, through the coil of fast-acting relay 484, and lead 702, from which it divides and flows in various proportions to the two clutches, depending on the relative potentials of control grids 680, 686. Relay 484 operates to open switch 482 when the current in its coil exceeds a certain predetermined value and releases to allow switch 482 to be closed by its biasing means when the coil current decreases below said predetermined value. Since switch 482 connects both feed motors 62, 64 to the power source Z, neither of these motors can operate when switch 482 is open. Therefore, when the current in the coil of relay 484 exceeds a certain predetermined value either motor 62 or 64 (whichever one happens to be running) will stop and remain stopped until the relay coil current decreases below said predetermined value. Motors 62, 64 are preferably of the synchronous inductor type, which is capable of stopping with extreme rapidity upon interruption of the power source to which it is connected. The current flowing in the coil of relay 484 is at a minimum when the gap between follower 60 and pattern 56 is at its preselected mean value. If the gap is either increased or decreased, within the normal operating range, from said preselected mean position the current in one clutch increases slightly and the current in the other clutch decreases by an approximately equal amount, reaching zero at either the high or low limit of the normal operating range. (Although current in the clutch reaches zero the clutch driven element 200 remains lightly attracted against the driving element because of the residual magnetic flux therein.) In the circuit herein described the preselected mean gap length is approximately .0015 inch, and the normal operating range is plus or minus .0005 inch; that is, in normal operation the distance between follower 60 and pattern 56 at the point of closest proximity varies between limits of approximately .001 inch and .002 inch. Within this range the current flowing through the coil of relay 484 is substantially constant because any increase in current flowing to one clutch is offset by an approximately equal decrease in current flowing to the other clutch. However, if the gap between the follower and pattern is varied beyond the normal operating range the current in one clutch remains at zero while the current in the other clutch continues to increase, resulting in an increase in the current in the coil of relay 484 to a value above the level required to open switch 482 and thereby stop feed motor 62 or 64, whichever one happens to be running.

It will be seen that a small deviation of the gap length between follower and pattern to either side of the selected mean gap length causes a biasing of the currents in the clutches which results in an increase in the torque delivered by one clutch and a decrease in torque delivered by the other clutch. The net thrust delivered to the quill by the clutches, so biased is in a direction tending to reduce the deviation which initiated the biasing of the clutches. If the clutch drive succeeds in correcting the deviation or at least prevents it from increasing beyond the normal operating range, the table and cross-slide continue their feeding and scanning action. However, if the deviation increases beyond certain predetermined limits, the clutch biasing not only increases, but the motion of the table and cross slide immediately stop due to the opening of switch 482 by relay 484, and remain at rest until the deviation from the mean of the gap between follower and pattern has decreased to a small enough value to allow switch 482 to be closed.

Because of the gap-acceleration signal superimposed upon the gap-length signal by the differentiating circuit comprising condensers 626, 630 and resistors 640, 642, the relative currents flowing in clutches 68, 70 are a function not only of the length of gap between follower 60 and pattern 56, but also of the acceleration of the gap length. This method of controlling clutch currents by a combination of position and acceleration signals results in a very smooth following action without steps, overshooting or instability. Without the superimposed acceleration signal the clutches would exert a net restoring force on the quill and follower arm which would be substantially proportional to the deviation of the gap length between the follower and pattern from the selected mean, regardless of the rate at which the deviation is changing and it would be difficult to obtain a smooth following action. However, when an acceleration signal is superimposed upon the position signal, the clutches react not only in proportion to the deviation of the gap length from the selected mean, but also to the acceleration of the gap. For example, the follower might be exactly at its mean position relative to the pattern, but accelerating away from it at a high rate. Under this condition a high current would flow in the infeeding clutch, tending to prevent any deviation of the follower outwardly from its mean position.

It has been found to be advantageous to provide a means of automatically backing the cutter and follower away from the workpiece and pattern in the event of power failure in the power lines 448, 450. Control grid 680 of tube 682 is connected by lead 708 through switch 736 to ground. Switch 736 is held in the open position by the energized coil 444 of relay 456 during operation of the control circuits. In the event of power failure in the supply lines 448, 450 coil 444 is immediately de-energized, thereby permitting the biasing means of the relay to move switch 736 to its closed position. The potential of control grid 680 is thereby immediately raised to ground potential causing a relatively large current to flow through outfeeding clutch 70 during the period while the clutch-drive motor 66 is coasting to a stop. The filter condensers 542, 544 of the plus 350 volt supply are of large enough capacity to furnish current to the upfeeding clutch during the stopping period. The cutter and follower are thereby backed away from the workpiece and pattern in case of power failure and the danger of damaging the workpiece or pattern due to improper following is avoided.

Milliammeters 700, 706 conected in series respectively with clutches 70, 68 give a visual indication of the current flowing in the respective clutches. Such an indication is useful in making the initial adjustments of the circuit, such as the settings of contacts 674, 676. The milliammeters are also useful in setting up the pattern on the machine because their indications of relative currents flowing through the clutches serve as an indirect indication of the distance of the follower from the pattern surface, enabling very precise adjustments to be made of the height of the follower relative to the tool.

To limit the downward feeding of the cutter and follower, as in making roughing cuts, a micrometer stop contact point 324 is connected through resistor 710 to grid 608 of tube 610. When micrometer screw 326, grounded as at 712, is set for limiting downfeed, contact 324 approaches the top surface of screw 326 as the tool and follower are fed downward along a downward sloping surface of pattern 56, approaching the desired limiting depth of cut. When contact 324 approaches within a very small distance from screw 326 a spark will be established in the gap therebetween, causing a current to flow in resistors 604, 710, through the spark gap to ground. The resulting voltage drop in resistor 604 causes a decrease in the potential on grid 608 of tube 610; and by the previously described action of the clutch control circuit in response to the voltage on grid 608, further down feeding is prevented even though the surface of pattern 56 may recede from follower 60. When an upward sloping surface of the pattern again approaches within the normal operating distance from the follower, the gap between the follower and pattern will again take over control of the clutches, and the follower will follow the contour of the pattern. The micrometer depth stop thus serves to limit the maximum depth of cut to any predetermined value within the capacity of the cutter.

In order to reduce reactive oscillations of the spark between follower 60 and pattern 56 or between contact 324 and micrometer screw 326 to a negligible value, resistors 586, 604, 710 preferably are of relatively high resistance and preferably are located as near their respective spark gaps as practical.

An alternative signal input circuit is shown in Figure 15. In this circuit a triode vacuum tube 714 is connected in a cathode follower circuit comprising tube 714 and resistor 716. The anode 718 is connected to the plus 1000 volt D. C. line by lead 500a. The cathode 734 is connected to ground through resistor 716. The cathode is also connected through series resistors 724, 726 to an electrode 722 of a spark gap. (The electrode 722 may be either a follower, or a micrometer depth contact.) The grid 728 of tube 714 is connected by lead 730 to lead 732 between resistors 724, 726. When electrode 722 is far enough away from a ground member such as 740, that no spark exists therebetween, no current flows in resistors 724, 726; and grid potential is therefore equal to cathode potential. Under this condition relatively large current flows through tube 714 between the anode and cathode thereof and through resistor 716. Because of the resulting relatively high voltage drop in resistor 716, the cathode voltage and the voltage on electrode 722 are relatively high. (In the circuit shown these voltages are in the order of 950 volts.) If electrode 722 is moved to within approximately .003 inch from a grounded surface 740 a spark will be established therebetween and current will flow through resistors 724, 726. The resulting voltage drop in resistor 724 biases grid 728 to a voltage below the cathode voltage, thereby causing a reduction in current flow through the tube and resistor 716. As electrode 722 is moved nearer to grounded surface 740, more current will flow in the spark and in resistors 724, 726, thereby further biasing grid 728 and causing a further decrease in current flow between anode 718 and cathode 734. It will be seen that the current flowing in resistor 716 is thus a function of the length of gap between the electrode 722 and grounded surface 734. This circuit, therefore, may be employed to control the clutches by disconnecting leads 626, 624 from their respective connections to cathode 614 and contact 623, and reconnecting them respectively to cathode 734 and contact 623a. Leads so connected are shown in Figure 15 as 626a and 624a.

Summarizing the action of the clutch control circuit, a signal voltage is maintained on follower 60 whose potential depends on the distance of said follower from a grounded conductive pattern surface 56 at their point of closest proximity. A low-current high voltage spark exists in the gap between the follower and the pattern surface; and the current in this spark varies with the length of gap, the current increasing with decreasing gap. Current from a high voltage supply (on the order of 1000 volts) flows through resistor 586 to the follower and thence through the spark to the grounded pattern. As the spark current varies due to variations in the length of gap between follower and pattern, the voltage drop across resistor 586 varies accordingly, thus producing a signal potential on follower 60 which is proportional to the length of gap.

In response to variations in this signal potential on follower 60, the clutch control circuit varies the current flowing in clutches 68, 70 in such a manner that the clutches tend to drive the tool and follower in a direction and at a velocity to keep said variations in follower signal potential at a minimum. As the pattern is moved longitudinally and transversely by the feeding action of the table 50 and cross slide 52 a constant potential would be maintained on follower 60 only if it were moved toward and away from the table so as to follow the pattern contour at a perfectly constant spacing from the surface of the pattern. In the actual operation of the machine, small variations in the gap between follower and pattern do occur, and these variations are utilized to control and continually correct the motion of the follower to keep the deviations from the desired gap to a minimum.

The signal voltage on follower 60 is applied to the grid of tube 610 connected in a cathode follower circuit with resistor 612. The voltage on the cathode of tube 610 follows the variations in grid voltage at a slightly lower level, but the current flowing in the cathode and resistor 612 is at a much higher level than the spark current in follower 60. The variations in voltage on the cathode of tube 610 are differentiated twice in the differentiating circuit comprising condensers 628, 630 and resistors 640, 642 in order to obtain a stabilizing signal substantially proportional to the acceleration of the gap between the follower and pattern. A portion of the cathode voltage of tube 610 appears on cathode resistor 612 at contact 623 and is added to the acceleration signal from the differentiating network in order to obtain, in lead 632, a signal voltage which varies as a function of the algebraic sum of the length and acceleration of the gap between the follower and pattern. This combined signal voltage is applied to the grid 634 of tube 636, connected in a phase inverting circuit with anode resistor 646 and cathode resistor 650. The voltage on both the anode and cathode of tube 636 varies in proportion to the combined signal voltage applied to grid 634, the cathode voltage varying in phase with the grid voltage and the anode voltage varying in opposite phase to the grid voltage. Tapped resistors 660, 672 connect both anode and cathode to a minus 350 volt supply. At the selected positions of contacts 674, 676 on resistors 660, 672 the voltage varies with variations in anode and cathode voltage respectively, but through a smaller range and at a level slightly below ground potential. Thus at contacts 674, 676 two signal voltages are available, varying in mutually opposite phase in response to both the length and acceleration of the gap between the follower and pattern, at a level and through a range capable of controlling the current flow in twin triode tube 530 from the maximum needed by the clutches to complete cut off. The voltages on contacts 674, 676 are applied to the control grids 680, 686 of twin triode tube 682, whose anodes 696, 698 are connected respectively in series with outfeeding clutch 70 and infeeding clutch 68. In response to the oppositely varying potentials on control grids 680, 686 the currents in clutches 68, 70 vary oppositely, substantially in proportion to the combined gap length-gap acceleration signal produced on lead 632. The net thrust of the clutches on the quill therefore varies in response to both the deviation of the follower from its preselected means spacing relative to the pattern and the acceleration of the follower relative to the pattern. The motion of the quill (and the follower which is physically linked thereto) is thereby caused to duplicate, with very small error, the theoretically perfect motion required to maintain the follower at a perfectly constant spacing from the pattern. If any condition occurs wherein, with continuing transverse or longitudinal feeding of the pattern, the controlled feeding action of the quill is incapable of maintaining the deviation of the gap between the follower and pattern within predetermined limits (as, for example, when a vertical shoulder on the pattern is fed transversely toward the follower) then the current flowing through fast-acting relay 484 to the clutches increases above a predetermined limit and switch 482 is opened. This action immediately stops the transverse or longitudinal feeding of the table and the pattern attached thereto until the feeding of the quill has again decreased the deviation of the gap to within the preselected limits.

A preferred form of this invention and its application to a machine tool for duplicating the form of a pattern in a workpiece is described above. However, as will be apparent to those skilled in the art, the invention is not limited to the specific embodiments herein illustrated and described nor are the novel elements disclosed limited to the particular combinations and purposes set forth. Therefore, it is to be understood that the invention is not limited to the form specifically described above in illustration of its principles, but may be used, either wholly or partly in other ways without departure from its spirit as defined by the following claims:

1. In combination with a work table movable in directions normal to each other, a member movable in the direction of a third axis perpendicular to said first and second axes, a tool support and a follower support on said member for movement therewith, and means for applying to said tool support in the direction of said third axis opposed thrust forces the magnitude and sense of the resultant of which is a function of the proximity of said follower to a pattern on said work support.

2. In combination with a work table movable in directions normal to each other, a member movable in the direction of a third axis perpendicular to said first and second axes, a tool support and a follower support on said member for movement therewith, magnetic clutches drivingly connected to said member, and means for applying current to said magnetic clutches to provide opposed thrust forces to said clutches the magnitude and sense of the resultant of which is a function of the proximity of said follower to a pattern on said work support.

3. In combination with a work table movable in directions normal to each other, a member movable in the direction of a third axis perpendicular to said first and second axes, a tool support and a follower support on said member for movement therewith, and electronic circuit means for applying to said tool support in the direction of said third axis opposed thrust forces the magnitude and sense of the resultant of which is a function of the voltage drop between said follower and a pattern on said work table.

4. In combination with a work table movable in directions normal to each other, a member movable in the direction of a third axis perpendicular to said first and second axes, a tool support and a follower support on said member for movement therewith, magnetic clutches drivingly connected to said member, and electronic circuit means for applying to said magnetic clutches opposed thrust forces the magnitude and sense of the resultant of which is a function of the voltage drop between said follower and a pattern on said work table and closely adjacent said follower.

5. In combination with a work table movable in directions normal to each other, a member reciprocably movable in the direction of a third axis perpendicular to said first and second axes, a tool support and a follower support on said member for movement therewith, and means for applying to said tool support in the direction of said third axis opposed thrust forces the magnitude and sense of the resultant of which is a function of the voltage drop across the gap between said follower and a pattern on said work table closely adjacent said follower.

6. A duplicating machine comprising, a base, means for securing a tool supporting means and a work supporting means to said base in selected relative positions, means for relatively moving one of said supporting means to produce a scanning motion in a first plane of a tool carried by said tool supporting means relative to a workpiece carried by said work supporting means, said latter means supporting a pattern, and a sensing device connected to the other of said supporting means for producing in a second plane a scanning motion of said sensing device relative to said pattern identical to said scanning motion of said tool and workpiece, means responsive to variations in the proximity of said sensing device to said pattern for causing said sensing device to sense differences in the displacement from said second plane while said tool scans different portions of said pattern, and means governed by the sensing action of said sensing device for positioning said tool relative to said first plane at distances therefrom equal to the displacement of the corresponding surface portions of said pattern from said second plane.

7. A duplicating machine comprising, a base, means for securing a tool supporting means and a work supporting means to said base in selected relative positions, means for relatively moving one of said supporting means to produce a scanning motion in a first plane of a tool carried by said tool supporting means relative to a workpiece carried by said work supporting means, said latter means supporting a pattern connected to one of said supporting means, and a sensing device connected to the other of said supporting means for producing in a second plane a scanning motion of said sensing device relative to said pattern identical to said scanning motion of said tool and workpiece, electronic circuit means responsive to variations in the voltage drop between said sensing device and said pattern for causing said sensing device to sense differences in the displacement from said second plane of different portions of said pattern, and means governed by said voltage drop for positioning said tool relative to said first plane at distances therefrom equal to the displacement of the corresponding surface portions of said pattern from said second plane.

8. A duplicating machine comprising, a base, means for securing a tool supporting means and a work supporting means to said base in selected relative positions, means for relatively moving one of said supporting means to produce a scanning motion in a first plane of a tool carried by said tool supporting means relative to a workpiece carried by said work supporting means, said latter means supporting a pattern connected to one of said supporting means, and a sensing device connected to the other of said supporting means for producing in a second plane a scanning motion of said sensing device relative to said pattern identical to said scanning motion of said tool and workpiece, electronic circuit means responsive to variations in the voltage drop between said sensing device and said pattern for causing said sensing device to sense differences in the displacement from said second plane of different portions of said pattern, and means governed by the sensing action of said sensing device to apply to said tool support opposed thrust forces the magnitude and sense of the resultant of which is a function of the distance between said sensing device and pattern.

9. A duplicating machine comprising, a base, means for securing a tool supporting means and a work supporting means to said base in selected relative positions, means for relatively moving one of said supporting means to produce a scanning motion in a first plane of a tool carried by said tool supporting means relative to a workpiece carried by said work supporting means, said latter means supporting a pattern connected to one of said supporting means, and a sensing device connected to the other of said supporting means for producing in a second plane a scanning motion of said sensing device relative to said pattern identical to said scanning motion of said tool and workpiece, electronic circuit means responsive to variations in the voltage drop between said sensing device and said pattern for causing said sensing device to sense differences in the displacement from said second plane of different portions of said pattern, and means governed by variations in said voltage drop for moving said tool toward and from said first plane.

10. A duplicating machine comprising, a base, means for securing a tool supporting means and a work supporting means to said base in selected relative positions, means for relatively moving one of said supporting means to produce a scanning motion in a first plane of a tool carried by said tool supporting means relative to a workpiece carried by said work supporting means, said latter means supporting a pattern connected to one of said supporting means, and a sensing device connected to the other of said supporting means for producing in a second plane a scanning motion of said sensing device relative to said pattern identical to said scanning motion of said tool and workpiece, a circuit having a gap therein between said sensing device and pattern, and means responsive to variations in the voltage drop in said circuit for causing said sensing device to sense differences in the displacement from said second plane of different portions of said pattern, and means governed by said voltage drop for maintaining said tool relative to said first plane at distances therefrom equal to the displacement of the corresponding surface portions of said pattern from said second plane.

11. In a duplicating machine, a base, a work supporting member movable in a plane in directions normal to each other, a tool supporting member movable toward and from the plane of said table movements, a pattern having a conductive surface on said work supporting member, a sensing device on said tool supporting member spaced slightly from said pattern, and electronic means for moving said tool toward and from the plane of said table movement, said last named means including a circuit from said sensing means to said conductive surface of said pattern.

12. In a duplicating machine, a base, a work supporting member movable in a plane in directions normal to each other, a tool supporting member movable toward and from the plane of said table movements, a pattern having a conductive surface on said work supporting member, a sensing device on said tool supporting member and adjacent said pattern, and electronic means controlled by said sensing means for moving said tool to and from the plane of said table movement, said last named means including a control circuit between said sensing means and the conductive surface of said pattern.

13. In a duplicating machine, a base, a work supporting member movable in a plane in directions normal to each other, a tool supporting member movable toward and from the plane of said table movements, a pattern having a conductive surface on said work supporting member, a sensing device on said tool supporting member spaced from and adjacent said pattern, and electronic means controlled by said sensing means for moving said tool to and from the plane of said table movement, said last named means including a control circuit from said sensing means through the space separating the sensing device and pattern to the conductive surface of said pattern.

14. In a duplicating machine, a base, a work supporting member movable in a plane in directions normal to each other, a tool supporting member movable toward and from the plane of said table movements, electromagnets controlling movements of said tool support, a pattern having a conductive surface on said work supporting member, a sensing device on said tool supporting member spaced slightly from said pattern, and electronic means controlled by said sensing means energizing said electromagnets for moving said tool to and from the plane of said table movement, said last named means including a control circuit from said sensing means through the space separating the sensing device and pattern to the conductive surface of said pattern whereby the voltage variation in said control circuit due to movements of said sensing device toward and from said pattern control the energization of said magnets.

References Cited in the file of this patent

UNITED STATES PATENTS

| Number | Name | Date |
| --- | --- | --- |
| 625,968 | Durkee | May 30, 1899 |
| 640,948 | Rightmeyer | Jan. 9, 1900 |
| 923,930 | Baerbalck | June 8, 1909 |
| 1,423,154 | Rosak | July 18, 1922 |
| 1,462,354 | Pero | July 17, 1923 |
| 1,683,581 | Shaw | Sept. 4, 1928 |
| 1,988,458 | Minorsky | Jan. 22, 1935 |
| 2,032,016 | Hitner | Feb. 25, 1936 |
| 2,173,446 | Heindlhofer | Sept. 19, 1939 |
| 2,206,942 | Cook | July 9, 1940 |
| 2,234,775 | Parsons | Mar. 11, 1941 |
| 2,315,176 | Zacharia | Mar. 30, 1943 |
| 2,354,391 | McCourt | July 25, 1944 |
| 2,412,339 | Jeffreys | Dec. 10, 1946 |
| 2,413,274 | Wilkie et al. | Dec. 24, 1946 |
| 2,434,854 | Junkins | Jan. 20, 1948 |
| 2,435,280 | Jaezer | Feb. 3, 1948 |
| 2,453,957 | Allen | Nov. 16, 1948 |
| 2,455,882 | Shaw | Dec. 7, 1948 |
| 2,460,914 | Wright | Feb. 8, 1949 |
| 2,483,410 | Grieg | Oct. 4, 1949 |
| 2,500,850 | Miller | Mar. 14, 1950 |
| 2,511,956 | Wetzel | June 20, 1950 |
| 2,549,761 | Adams | Apr. 24, 1951 |

FOREIGN PATENTS

| Number | Country | Date |
| --- | --- | --- |
| 303,979 | Italy | Dec. 22, 1932 |